June 14, 1955 — R. G. PINKERTON — 2,710,796
METHOD OF MAKING IRON BEARING MATERIAL
FOR TREATMENT IN A BLAST FURNACE
Filed May 26, 1954
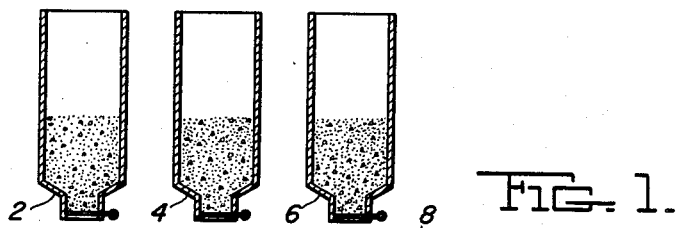
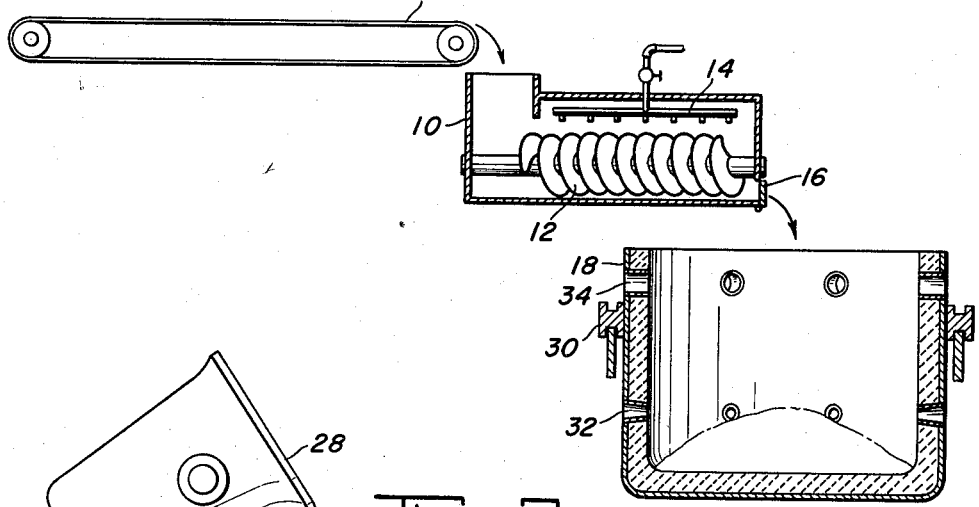
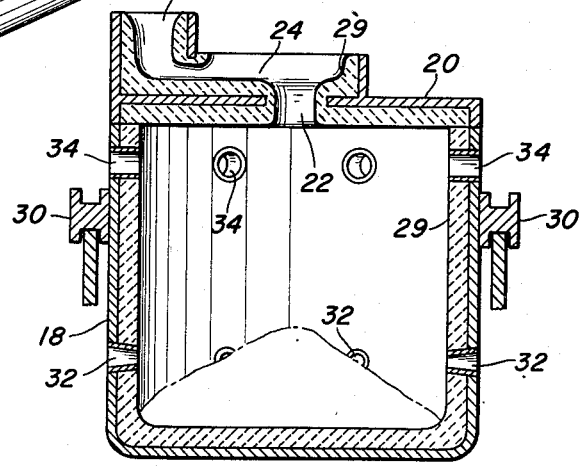
INVENTOR:
ROBERT G. PINKERTON,
BY: Donald G. Dalton
his Attorney.

United States Patent Office 2,710,796
Patented June 14, 1955

---

2,710,796

METHOD OF MAKING IRON BEARING MATERIAL FOR TREATMENT IN A BLAST FURNACE

Robert G. Pinkerton, Wexford, Pa., assignor to United States Steel Corporation, a corporation of New Jersey Application May 26, 1954, Serial No. 432,559

4 Claims. (Cl. 75—25)

My invention relates to a method for the treatment of blast furnace flue-dust and open hearth slag to combine these waste materials into a product suitable for subsequent treatment in a blast furnace to recover the metallic content thereof.

A considerable loss of metallics in the form of fine particles of ore entrained in the flue gases occurs during normal blast furnace operations. While this dust can be readily separated from the flue gases, present methods for agglomerating and sintering the fines into particles of the proper size and strength are costly and unsatisfactory. A second source of loss in blast furnace operations is the occasional off-heats which are produced. These are utilized in subsequent refining operations only at increased expense and refining time. Another source of loss in steel making operations is metallics in the slags of the refining processes. It has been proposed to crush and carefully size this slag for charging into the blast furnace as part of the furnace burden. Crushing and sizing, however, are quite costly and only a small portion of the open hearth slag produced is treated in this manner.

I am aware that proposals have been made to mix flue-dust with molten slag or molten iron. In the case of a mixture of dust and molten iron, the proposals contemplated charging the molten mixture directly into the open hearth or other refining apparatus. Mixing the dust and molten iron, however, was never solved in a practical manner. As regards dust and molten slag mixtures, the mixtures were cast, or cast, crushed and sized to produce an aggregate for charging into the blast furnace. These proposals also fell short of practicality, the resulting aggregate being too dense to be readily treated in the furnace.

Accordingly, it is an object of the present invention to overcome the foregoing difficulties and to provide a practical method for treating blast furnace flue-dust and open hearth slag to produce a strong but semi-porous product of high iron content adapted to charging and treatment in a blast furnace.

This and other objects will be apparent from the following specification when read in conjunction with the attached drawing in which:

Figure 1 is a flow chart showing the steps and characteristic apparatus for carrying out the methods of the present invention;

Figure 2 is a cross sectional view showing details of a vessel suitable for treating the materials in accordance with the principles of the invention.

With particular reference to the drawing, the reference numerals 2, 4 and 6 identify conventional feed hoppers which may be equipped with conventional weighing or volume measuring means, not shown. The hopper 2 contains a supply of open hearth slag crushed and sized to pass about a two inch screen. Hopper 4 contains a supply of blast furnace flue-dust. While not essential, the presence of some carbon aids in the subsequent treatment of the slag and dust. Ordinarily, blast furnace flue-dust contains sufficient carbon in the form of coke dust, occasionally however the furnace dust is substantially pure ore. To take care of this possibility a supply of additional carbon can be provided in the hopper 6. Coke-breeze or similar waste coke screenings are a convenient form of such additional carbon. As will be subsequently explained, the coke-breeze can be mixed with roll scale, scarfing cinder, chips, turnings or borings, or similar metal containing waste incident to steel mill operations. Alternatively, a separate hopper, not shown, can be provided for the latter metal containing waste. The hoppers are positioned in line over a belt conveyor 8 adapted to move measured quantities of the materials to a batch type mixer 10. The latter is equipped with screw type mixing blade 12 which also serves to discharge the mixed materials. The mixer is provided with water sprays 14 through which a regulatable quantity of water can be added to the materials. The mixed and dampened materials are discharged through mixer-discharge-door 16 into a refractory lined vessel 18. The latter is provided with a removable cover 20 having a hot metal charging hole 22 centrally located therein. Hot metal is conducted to the hole 22 by a hot metal runner 24 formed in the upper surface of the cover for this purpose. A pouring thimble 26 is provided at the forward end of the runner to receive hot metal from a ladle 28 or other source. The undersurface of the cover, the surfaces of the charging hole, the runner and pouring thimble are lined with a suitable refractory 29. Treating vessel 18 is preferably a right cylinder mounted on trunnions 30 and equipped with conventional means, not shown, for tilting between operating and discharge positions. The major axis of the vessel is vertical during treatment. The vessel is provided with several tuyères or air blast input ports 32 located at intervals along a circumference several inches from the bottom of the vessel; exhaust ports 34 are provided along a circumference toward the top of the cylinder.

My method of treatment contemplates mixing 1 to 2 parts by weight of crushed open hearth slag and 1 to 3 parts by weight of blast furnace flue-dust with sufficient water, 5 to 15% by weight of the total of slag and dust, to dampen; and then slowly pouring 1 part by weight molten pig iron over the dampened mixture while at the same time subjecting the materials to a blast of low pressure oxygen containing gas, such as air. Treatment in this manner results in agglomerating the dust and slag into a mass of semi-metallic spongy lumps which, because of their porosity and strength, are ideally suited for subsequent treatment as a part of the burden in a blast furnace. Both physical and chemical interaction of the ingredients contribute to this result. The reactions are quite violent and should be conducted in a closed vessel for safety reasons. Moisture is essential; steam generated by the hot metal striking the dampened mixture serving to mix the reacting ingredients and to achieve the desired porosity in the product. Excessive water, however, must be avoided; the generation of steam is too violent, moreover the available heat is limited. The heat requirements are supplied in a large part from the sensible heat of the molten iron but this is supplemented by burning of the iron by the oxygen in the blast. Burning of carbon by the oxygen affords an additional source of heat; carbon also acts to reduce some of the iron oxide in the dust, thus supplements the bonding or cementing action of the molten iron. Accordingly, although not essential, a small amount of free carbon is desirable in the mixture. Any unburned or unreacted carbon is simply bonded into the product by the freezing of the molten iron, and since carbon is a norml constituent of the blast furnace charge acts to facilitate the subsequent recovery of metallics from the product when the latter is charged into a blast furnace.

While primarily intended as a method for treating blast furnace flue-dust, my method is adapted to the treatment of any comminuted waste of high iron oxide content such as iron ore fines, rolling mill scale, scarfing cinder or the like and such material may be substituted for all or part of the blast furnace flue-dust, provided such substitute material contains 5–20% by weight of carbon. The latter may be added in the form of coke-breeze.

It is also possible by my method to put light metal scrap such as chips, borings or turnings into more readily handleable form. This can be done simply by including a portion of such in the charge to the mixer. Such practice increases the metal content of the product. The amount of light metal scrap which can be included however is limited since heat supply is limited. As previously mentioned, heat deficiencies can be met by charging additional carbon or coke-breeze in with the scrap, but the time of treatment is extended. From a practical standpoint, the light scrap charge should not exceed about 1 part by weight of the slag-dust mixture.

As a specific example of operations under my invention, I charge:

| | Parts by weight |
|---|---|
| Crushed (to pass a 2" screen) open hearth slag | 1 |
| Blast furnace flue-dust | 2 | into mixer 10 and mix these materials with about 10% by weight of water added through sprays 14. I mix the materials thoroughly and discharge the damp mixture into the vessel 16. The cover 20 is then put in place and 1 part by weight molten pig iron is slowly poured into the vessel through thimble 26, runner 24 and opening 22 so as to cascade over the damp charge. Simultaneously I introduce blasts of air at about 6–8 p. s. i. through tuyère 32. The action of the molten iron on the damp mix is quite violent, and is essentially complete with the completion of the pouring at which time the air blasts can be discontinued, but preferably the blowing is continued for 3 to 4 minutes after completion of the pouring. After turning down the blast, the cover is removed and the product dumped from the vessel. Upon cooling, the mixture may be crushed and screened and the fines returned for retreatment. Ordinarily crushing and screening are not needed as the operation produces fairly uniform lumps of a size suitable for charging directly into a blast furnace.

As another example, the charge to mixer 10 consists of:

| | Parts by weight |
|---|---|
| Blast furnace flue-dust | 1 |
| Mill scale mixed with 5–20% coke breeze | 1 |
| Crushed open hearth slag | 1 |

After thoroughly mixing this charge with 15% by weight of water, the mixture is treated as above described.

Further examples comprise the addition of 1 part by weight of mill-turnings mixed with 5–20% by weight coke breeze to mixer-charges of either of the above examples. In these instances it is preferable to continue the blowing for a few minutes after the pouring of the 1 part of molten metal is completed. The continued blowing serves to more completely bond the mill-turnings, although a usable product is obtained without resort to this step.

While I have shown and described certain specific embodiments of my invention, I do not wish to be limited exactly thereto except as defined in the scope of the appended claims.

I claim:

1. The method of treating comminuted iron oxide and slag to produce a product suitable for treatment in a blast furnace to recover the metallic content thereof comprising mixing iron oxide and slag, dampening said mixture and then pouring molten iron onto said dampened mixture while subjecting said mixture to an oxygen containing blast.

2. The method of treating comminuted iron oxide carbon and slag to produce a product suitable for treatment in a blast furnace to recover the metallic content thereof comprising mixing iron oxide containing 5 to 20% by weight of carbon and slag, dampening said mixture and then pouring molten iron onto said mixture while subjecting said mixture to an oxygen containing blast.

3. The method of treating blast furnace flue-dust and open hearth slag to produce a product suitable for treatment in a blast furnace to recover the metallic content thereof, comprising forming a dampened mixture of about 1 to 2 parts by weight of crushed open hearth slag and 1 to 3 parts by weight of blast furnace flue-dust with sufficient water to dampen said mixture and then slowly pouring about 1 part by weight of molten pig iron over the dampened mixture while subjecting the mixture to a blast of oxygen containing gas.

4. The method of treating blast furnace flue-dust and open hearth slag to produce a product suitable for treatment in a blast furnace to recover the metallic content thereof comprising forming a dampened mixture of about 1 to 2 parts of crushed open hearth slag and 1 to 3 parts of blast furnace flue-dust and water amounting to about 5 to 15% by weight of the total of the slag and flue-dust, and then slowly pouring about 1 part by weight of molten pig iron over the dampened mixture and simultaneously directing a low pressure blast of oxygen containing gas onto the mixture to form semi-metallic spongy lumps having sufficient strength to form part of a blast furnace burden.

No references cited.